(12) United States Patent
Perol

(10) Patent No.: US 6,259,234 B1
(45) Date of Patent: *Jul. 10, 2001

(54) CONVERTER MODULE FOR AN ELECTRICAL POWER SUPPLY AND A SYSTEM INCLUDING IT

(75) Inventor: Philippe Alfred Perol, Pd Den Haag (NL)

(73) Assignee: Agence Spatiale Europeenne, Paris Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/291,373

(22) Filed: Apr. 14, 1999

(30) Foreign Application Priority Data

Apr. 15, 1998 (FR) .................................................. 98 04661

(51) Int. Cl.$^7$ ........................................................ G05F 1/00
(52) U.S. Cl. ................................................................ 323/222
(58) Field of Search .................................... 323/220, 222, 323/265, 266, 271, 282

(56) References Cited

U.S. PATENT DOCUMENTS 3,696,286   10/1972   Ule .
5,486,752 * 1/1996   Hua et al. ............................ 323/222
5,977,754 * 11/1999  Cross .................................. 323/222

OTHER PUBLICATIONS

"A Novel Zero–Voltage Switched PWM Boost Converter", Record of the Annual Power Electronics Specialists Conference (PESC, Atlanta—Jun. 12–15, 1995—vol. 2, No. Conf. 26, Jun. 12, 1995, pp. 694–700.

"Analysis of a New Compound Converter as MPPT, Battery Regulator ANDBUS Regulator for Satellite Power Systems", Proceedings of the Annual Power Electronics Specialists Conference (PESC), Seattle, Jun. 20–25, 1993, No. Conf. 24, 20, Jun. 1993, pp. 846–852.

* cited by examiner

Primary Examiner—Matthew Nguyen
(74) Attorney, Agent, or Firm—Sughrue, Mion, Zinn, Macpeak & Seas, PLLC

(57) ABSTRACT

The invention relates to a converter module for delivering an electrical power supply from at least one first source generating electrical current, the module including both a first self-inductive branch extending between a power supply terminal for the first source and a node point and which is functionally associated with a shunt switch connected between the node point and a common mode pole, and a second branch extending between the node point and the common mode pole and presenting in series a controlled switch and a filter. The invention also provides a converter module wherein the filter has a first terminal for powering by an active terminal of a second source of electrical energy, in particular at least one battery.

15 Claims, 5 Drawing Sheets

CONVERTER MODULE FOR AN ELECTRICAL POWER SUPPLY AND A SYSTEM INCLUDING IT

The present invention relates to a converter module designed to supply electrical power both from a first source for generating electricity instantaneously, which source may be a current source, e.g. solar cells, and from a second source that stores energy, which may be a voltage source, e.g. storage batteries.

BACKGROUND OF THE INVENTION

Such converter modules are intended in particular for use on-board satellites in order to power a telecommunications bus. The power supply system is controlled from a main control system CMEA which delivers the signals required for operating the various modules.

On-board systems generally have three operating ranges, and sometimes only two operating ranges:

I) a regulation range or daytime mode: excess power supplied by the solar cells is diverted or "shunted" sequentially, e.g. using the so-called "S3R" technique;

II) the battery charging range (BCR): excess power delivered by the solar cells is used to charge the or each battery, and the charging current is controlled by a signal supplied by the amplifier MEA; and III) the battery discharge range (BDR) or "nighttime mode": current discharge from the batteries is controlled by a signal supplied by the amplifier MEA.

When two-range operation is used, then range II (battery charging) is omitted.

A more detailed description of a three-range system can be found in particular in the publication by P.R.K. CHETTY, entitled "Improved power conditioning unit for regulated bus spacecraft power system", published in the ESA Proceedings SP126 of the "3rd ESTEC Spacecraft Power Seminar", Sep. 21–23, 1977—NOORDWIJK (pp. 101–110).

In that technology, each of the operating ranges is provided by a specific module. For example, the prior art system shown in FIG. 1 implements 32 shunt modules numbered 1 to 32 and powered by the signals S3R, 12 battery discharge regulator modules numbered 1' to 12' and powered by signals BDR, and four battery charging regulator modules numbered 1" to 4" and powered by the signal BCR.

The modules 1 to 32 and 1' to 12' power the line BUS having capacitance C via forward-connected diodes as shown.

The modules 1 to 32 and 1" to 4" are powered by the current SA generated by the solar cells, while the modules 1' to 12' and 1" to 4" are powered by the voltage delivered by the storage battery(ies) BAT.

As shown in FIG. 1, the prior art system is complicated both from the point of view of the number of modules and from the point of view of the interconnections required.

Proposals have already been made to implement both-way modules that perform both battery charging II and discharging III. The resulting saving in terms of complexity is relatively marginal, since integrating the charging function makes it possible to omit only a small number of modules (see FIG. 1).

Proposals have also been made for a circuit that regulates by means of a switched "buck" regulator. Reference on this topic can be made to the article by G. SHIVANNA entitled "A new universal spacecraft power conditioner", published in "ESA Proceedings of 4th European Research Organization", September 1995, pp. 41 to 45.

OBJECTS AND SUMMARY OF THE INVENTION

The idea on which the invention is based is a shunt type module of topology that makes it possible to adapt a single module so that it can perform both of the above-mentioned functions I and III, and preferably to adapt a single module so that it can perform all three functions I, II, and III.

The invention also relates to a converter module for supplying an electrical power supply from at least a first source of electricity, in particular a current source, e.g. a solar panel, the module including a first branch having self-inductance that extends between a power supply terminal for the first source and a node point, and which is functionally associated with a shunt switch connected between the node point of the first branch and a common mode pole. It has a second branch having in series, between the node point and the common mode pole: a controlled switch and a filter, in particular a capacitive filter that is preferably damped. In particular, the input terminal of the switch can be connected to an output terminal of the filter and the output terminal of the switch is connected to said node point.

The node point is advantageously connected to an output terminal of the module via a first self-inductive element. The filter may have a power supply terminal constituted by an active terminal of a second source of electrical energy, e.g. one or more batteries. The power supply terminal of the filter can be connected to an output terminal of an input self-inductive element whose input terminal is connected to an active terminal of the second source, where appropriate via a switch element. The module may have a first or "buck" diode connected in parallel between the node point and the common mode pole.

In order additionally to give the module a function of charging the second source, and in a preferred embodiment, the module includes, in series between the node point and said active terminal of the second source: at least one second self-inductive element and at least one diode that is forward-connected relative to current for charging such a battery constituting said second source, and further includes a controllable charging switch connected between the common mode pole and a terminal common to said diode and to said second self-inductive element.

The module is advantageously controlled by a control circuit which presents at least one of the following operating modes:

a) the controlled switch can be in its closed position only if the shunt switch is in its active position;

b) the controlled switch and the shunt switch are controlled in phase opposition;

c) the control circuit controls the shunt switch as a function of the result of comparing the output voltage from the module and the current flowing through the first self-inductive element with respective thresholds;

d) the control circuit has a logic element that deactivates closure of the shunt switch when the control circuit is in a state of drawing current from or discharging the second source; and e) the controlled switch is activated on or off in response to comparing a sawtooth signal with the output voltage of the module.

BRIEF DESCRIPTION OF THE DRAWINGS

Other characteristics and advantages of the invention appear more clearly on reading the following description given by way of non-limiting example and with reference to the accompanying drawings, in which.

MORE DETAILED DESCRIPTION

Figure 1:
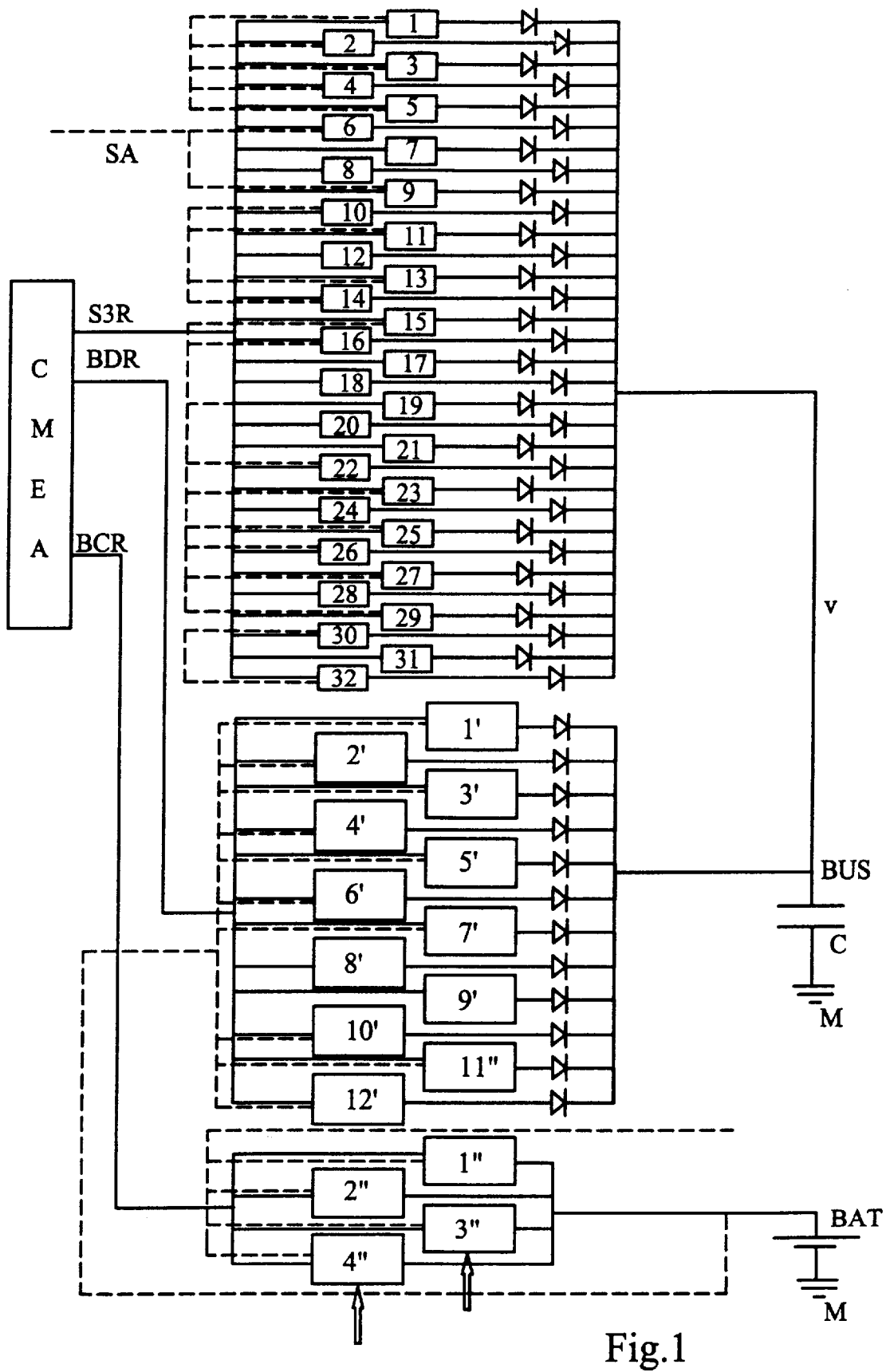
FIG. 1 shows a multi-module system of the prior art.

For a description of FIG. 1, reference should be made above to the introductory portion of the present description.

Figure 2:
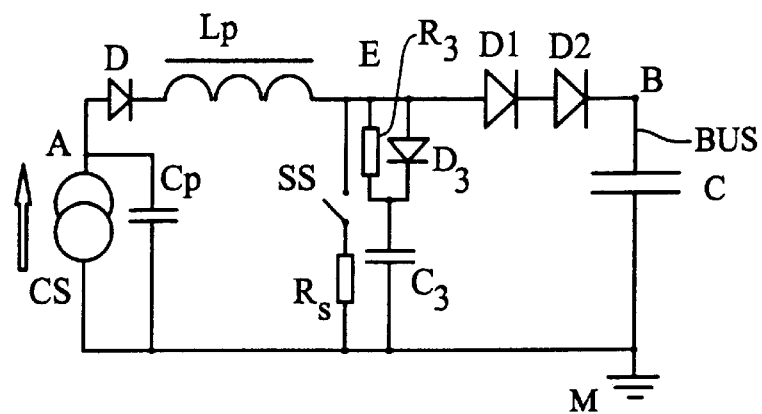
FIGS. 2 and 3 show examples of modules dedicated respectively to the shunt function and to the discharge function.

A sequential switching shunt regulation module or "S3R" module is shown in FIG. 2. Starting from an active terminal A at which current appears from an array of solar cells having stray capacitance $C_p$ and delivering a current $I_s$, and going to an output terminal B, this module presents in series: a forward-connected diode D; an inductor $L_p$ whose inductance can be less than 10 $\mu$H, for example (e.g. a few $\mu$H); and two forward-connected Schottky diodes D1 and D2, e.g. of the 60HQ100 type which produce a total voltage drop of about 1.1 V. The output terminal B is connected to the power supply bus BUS which has capacitance C. The following are connected in parallel between the terminal E which is common to the inductor $L_p$ and to the diode D1, and the common mode pole (or ground):

firstly a controllable shunt switch SS in series with a calibrated resistor $R_s$ for limiting current in shunt operation; and a diode D3 in parallel with a resistor R3 and connected in series with a capacitor C3 to form a damping circuit avoiding voltage surges which, when the shunt switch SS is opened, would otherwise be generated by the residual inductance between the shunt switch SS and the capacitance C of the bus BUS.

The solar panels are arranged in sections CS. In operation, certain sections are associated with modules whose shunt switches SS are open, powering the bus BUS, in other sections the modules are shunted, and in one section there are one or more modules which are switched sequentially, being alternately in circuit and shunted, so as to regulate the voltage on the bus BUS.

The shunt switches SS are controlled in on/off mode.

The efficiency of this shunt regulator is of the order of 97.5%. In sections that are shunted, the notion of efficiency is of no importance since the power concerned is in excess and must be dissipated. For sections which are permanently shunted, dissipation is generally not high.

In contrast, for the modules of the shunt section that is under sequential control, dissipation is critical since the stray capacitance $C_p$ of the array of solar cells discharges completely through the inductor $L_p$ each time the shunt switch SS closes, thereby generating losses which fortunately are at the low frequency at which the shunt is switched. For a solar array delivering 7 A at a voltage of 50 V, the stray capacitance $C_p$ is of microfarad order and losses are of the order of 10 W to 15 W for the corresponding section.

Figure 3:
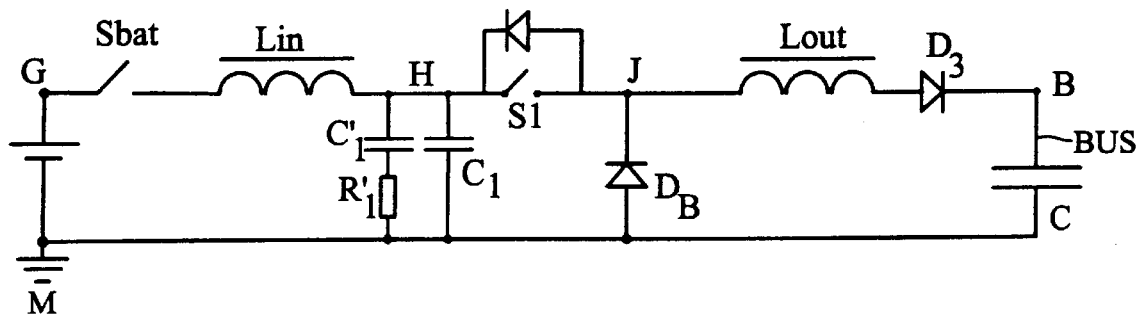

The module shown in FIG. 3 is a battery discharge regulator.

The embodiment shown is appropriate to the case where battery voltage is greater than that of the bus BUS, but it is well known how to modify this topology so as to include therein a voltage-raising module so as to form a boost regulator.

The function of the discharge regulator is to control the current delivered by the battery(ies) to the bus BUS.

For a battery voltage that is higher than the bus voltage, the best configuration is the series regulator ("buck converter"—see the above-mentioned article by G. SHIVANNA). This circuit comprises, between the input terminal G and the output terminal B connected to the bus BUS: a protection switch $S_{bat}$, an input inductor $L_{in}$, a series regulation switch ("buck" switch) $S_1$, an output inductor $L_{out}$, and a forward-connected diode $D_3$. An input filter, e.g. a damped input filter, comprises, in parallel between the terminal H and the common mode pole: a capacitor $C_1$ in parallel with a capacitor $C'_1$ and damped by a resistor $R'_1$. These modules are designed to be connected in parallel to form a corresponding number of controlled current sources. In addition, a "buck" diode is reverse-connected between the point J common to $S_1$ and $L_{out}$ and the common mode pole M.

Figure 4:
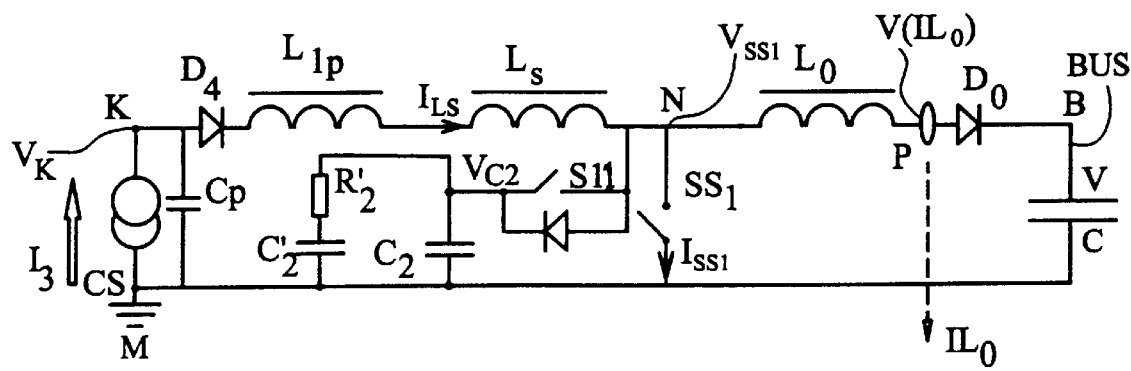
FIG. 4 shows the topology of a shunt module of the invention.

FIG. 4 shows the module of the invention whose topology enables the shunt function to be performed. The module as shown in FIG. 4 performs the shunt function only, however, as explained below, it can be adapted to perform both the above-mentioned shunt function and the above-mentioned discharge function.

It comprises in succession, between the terminal K connected to one of the terminals of an array of solar cells (current $I_s$, stray capacitance $C_p$) and the terminal B connected to the bus BUS: a forward-connected diode $D_4$, an inductor $L1_p$, an inductor $L_s$, an output inductor $L_o$, and an output diode $D_o$. $D_4$, $L_{1p}$, and $L_s$ constitute a first branch extending between the point K and the node point N. Between the node point N common to the two inductors $L_s$ and $L_o$, and the common mode pole, there are connected firstly a controlled switch $S_{11}$ in series with a preferably-damped filter $C'_2$, $R'_2$, $C_2$, with that assembly constituting a second branch. There is also a shunt switch $SS_1$ connected between the node point N and ground. $L_o$ and $D_o$ constitute an output branch.

The components $L_o$, $S_{11}$, $C_2$, $R'_2$, and $C'_2$ are analogous to the components $L_{out}$, $S_1$, $C_1$, $R'_1$, $C'_1$ of FIG. 3. $L_s$, a low inductance inductor (about 10 $\mu$H) is used to control the shunt current instead of using a resistive current limiter in series with the controlled switch SS as shown in FIG. 2. This makes it possible to limit losses in the shunt switch $S_1$.

The damping circuit ($C_2$, $R'_2$, $C'_2$) which is put into circuit and taken out of circuit by the switch $S_{11}$ serves advantageously to limit voltage surges when opening the switch $SS_1$. In its most general form, the filter can be of any type, in particular it can be capacitive, suitable for reducing voltage surge when the switch $SS_1$ is opened. To this end, it is advantageous to ensure that the switch $S_{11}$ cannot be in the closed position unless the switch $SS_1$ is in the open position. Preferably, $S_{11}$ is in the. open state when $SS_1$ is closed, and $S_{11}$ is closed when $SS_1$ is in the open state.

The above-described damper circuit serves simultaneously to protect the shunt module against voltage surges and to filter a battery discharge regulator, thus making the above-mentioned adaptation possible.

The circuit can thus be adapted as a module that performs two functions (shunt regulator for solar cells and discharge regulator for batteries).

Unlike the prior art shunt which requires two diodes connected to the bus (D1 and D2, FIG. 2), the shunt of the invention requires only one ($D_o$, FIG. 4) for the following reason.

In the event of a fault in the short circuit diode, the capacitance of the bus (C in FIG. 2 or FIG. 4) is connected to the bus via the inductor $L_o$. By controlling the current flowing through the inductor using a limit cycle system, the mean current flowing through the inductor naturally settles around zero if the shunt switch $SS_1$, FIG. 4, is actuated by the regulation (signal MEA). It thus suffices for the current sensor in $L_o$ to be capable of measuring a current around zero in order to obtain this effect naturally, and this applies in particular to a Hall effect current sensor.

In the event of a short circuit fault in the diode $D_o$, the solar panel section (Is, Cs) delivers all its current if the shunt switch $SS_1$ is not controlled by the regulation effect, or else a mean current around zero having a peak-to-peak value that corresponds to the hysteresis of the limit cycle. In the event of the entire module operating as a battery discharger (FIG. 6), this fault does not affect operation either.

Figure 5:
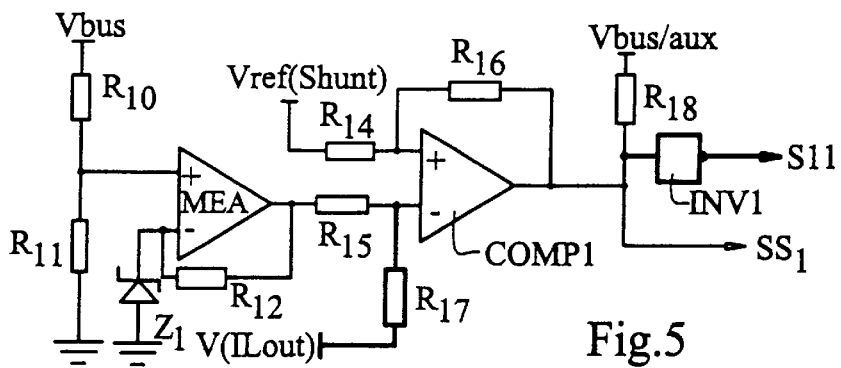
FIG. 5 shows a control circuit for controlling the module of FIG. 4.

The topology of FIG. 4 is associated with a control circuit as shown in FIG. 5, suitable for taking account of the output inductor $L_o$.

In the topology of FIG. 2, the output impedance of a solar cell section as seen by the bus BUS is close to zero, and as a result the capacitance C of the bus BUS is charged directly by the current produced by the solar cell section, thereby giving rise to a linear increase in the voltage V on the bus. When this voltage reaches the upper threshold of a hysteresis comparator, the shunt switch $SS_1$ is closed, thereby giving rise to a deficit of current on the bus and to a decrease in the voltage V until the lower threshold of the hysteresis comparator is reached, thereby causing the shunt switch $SS_1$ to be opened again.

With the module of FIG. 4, the output inductor Lo has the effect that the current produced by the solar cell section is not directly available on the bus as soon as the shunt switch $SS_1$ is opened. The current is established at a rate that is determined by the difference between the voltage on $C_2$ and the voltage V across the terminals of C.

If the function of $L_s$ is ignored, where $L_s$ serves only to control peak current in shunt mode, the problem seen from $C_2$ is the same as in FIG. 2. $C_2$ can be taken to the open circuit voltage of the solar cell section which is higher than the operating voltage when operating at full power.

FIG. 5 shows the control circuit associated with the module of FIG. 4. The additional elements ($R_{17}$, INV.1) compared with a conventional control circuit for the shunt module of FIG. 2 are drawn in heavy lines.

As can be seen in FIG. 5, the voltage V so the bus divided by a bridge $R_{10}/R_{11}$ is compared with the voltage of a zener diode $Z_1$. This comparison is performed at the inputs of an operational amplifier MEA. The output from MEA is fed to the inverting input of the comparator COMP1 via a resistor $R_{15}$. At that point it has added thereto the voltage V ($IL_o$) from the point P common the inductor Lo and the forward-connected diode $D_o$, via the resistor $R_{17}$. The reference voltage V of the shunt is applied to the non-inverting input of COMP1 via a resistor $R_{14}$. Since the resistor $R_{16}$. is connected to provide positive feedback, the amplifier COMP1 operates in on/off mode to control the shunt switch $SS_1$, and via a logic inverter INV1 to control the switch $S_{11}$.

As a result, the switches $SS_1$ and $S_{11}$ are operated in phase opposition.

The measure of the current $IL_o$ inserter via the resistor $R_{17}$ modifies the comparison performed by the hysteresis comparator and creates a current cycle of limited amplitude about a given point, thereby giving rise to more stable operation of the FIG. 4 shunt, and thus reducing voltage ripple on the bus.

It will be understood that if compensation by means of the current $IL_o$ is not implemented, then operation continues to be possible but the delaying effect of $L_o$ makes performance less satisfactory.

Controlling $S_{11}$ makes it possible to connect $C_2$ to the bus when the shunt switch $SS_1$ opens. If the module is used solely as a shunt, then $R'_2$ and $C'_2$ can be omitted, with the filter being reduced to a single capacitor $C_2$.

The operation of the FIG. 4 shunt module as controlled by the circuit of FIG. 5 is described in greater detail below.

For a given load on the bus, and if the array of solar cells presents $N_0$ sections, then n sections are directly coupled to a bus, $N_0$-n-1 sections are shunted (their switches $SS_1$ are closed), and one section serves to regulate the voltage on the bus by being controlled sequentially to act as a shunt. It is the operation for regulation purposes of this section that is described below.

The presence of the inductor $L_s$ e.g. of inductance 10 $\mu$H, makes it possible to limit the peak current to 15.8 A for an array of solar cells delivering 50 V and having stray capacitance of 1 $\mu$F.

It is assumed that the system is in a state where the solar cell section is fully shunted and the output current through $L_o$ is zero.

The current deficit on the bus causes the voltage on the bus to decrease and the output from the amplifier MEA (FIG. 5) drifts in the negative direction until the threshold of the comparator COMP1 is reached.

The shunt switch $SS_1$ is then opened and $S_{11}$ is closed. The capacitor $C_2$. which was previously isolated by $S_{11}$, has retained a voltage close to that of the voltage V on the bus or the voltage V' on the solar array.

When the switch $SS_1$ is opened, the current $I_s$ delivered by the solar cells begins to charge the stray capacitance in the vicinity of the voltage $V_{ss}$ of the solar array section. Before this voltage is reached, the voltage of the solar array exceeds the voltage V of the bus or the voltage across the terminals of $C_1$, and current begins to flow through $L_o$.

This gives rise to two effects. Firstly there exists a point where sufficient current is delivered to the bus to transform the voltage drift from the negative direction to drift in the positive direction. The second effect is that simultaneously a positive voltage resulting from the current through $L_o$ appears at the input of the comparator COMP1, thereby leading to drift in the value of the voltage which the bus needs to reach in order to cause the shunt switch $SS_1$ to be closed again.

When $SS_1$ is closed again, two possible cases exist. In the first case ("continuous conduction"), the voltage V on the bus reaches the lower threshold before the current has ceased to pass through $L_o$.

In the second case ("discontinuous conduction"), the current has completely stopped flowing through $L_o$ before V reaches the lower threshold. In both modes, the maximum amplitude of current excursion through $L_o$ is substantially the same and it is determined by the hysteresis of the comparator COMP1.

Figure 8C:
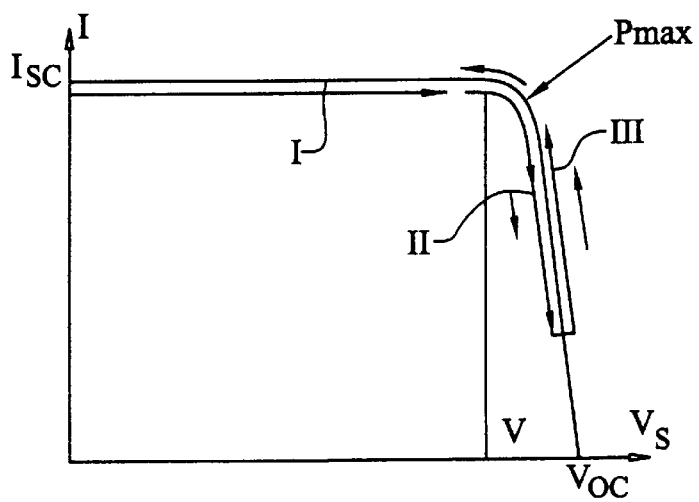
FIGS. 8a to 8c are timing diagrams showing how the module of FIG. 6 operates under certain conditions under the control of the circuit of FIG. 7.
Figure 8A:
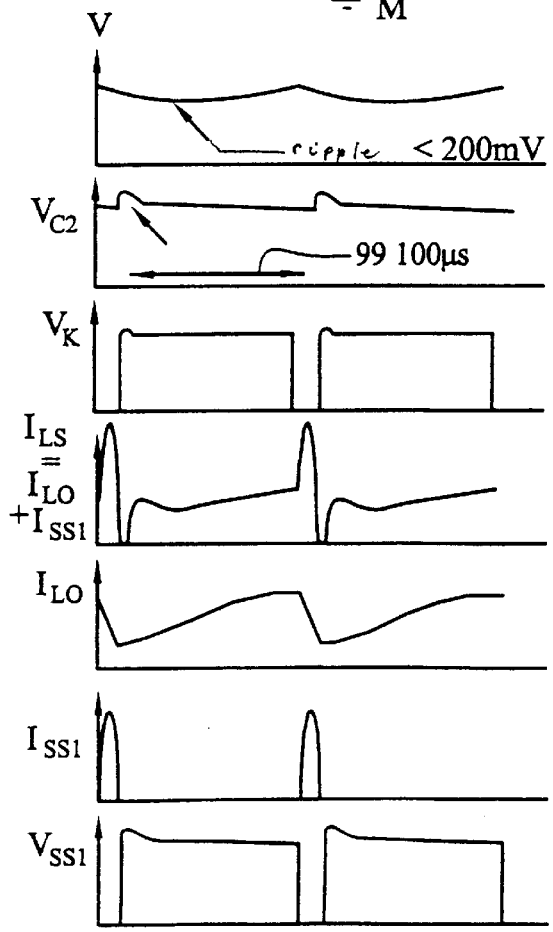
Figure 8B:
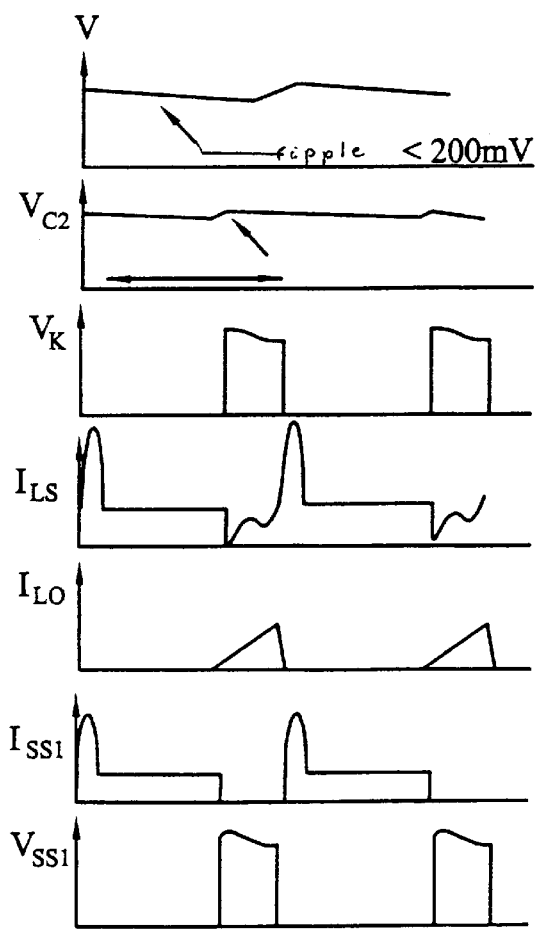

FIG. 8a gives voltage and current timing diagrams at the main points of the circuit in "continuous conduction" (current in the inductor not interrupted), and FIG. 8b gives the same timing diagrams for "discontinuous conduction" (current through the inductor interrupted).

On the voltage V, ripple remains below 200 mV in both cases (V=50 V).

The voltage $VC_2$ across the terminals of $C_2$ increases slightly when the shunt is closed in high current mode, because of the energy accumulated in $L_s$.

The amplitude of $IL_o$ in both modes is fixed by the switching hysteresis cycle. The value of $I_{SS1}$ in both modes corresponds to discharging $C_p$ through $L_s$.

The shunt of FIG. 4 does not present switching losses since, when $SS_1$ is closed, the current through $L_o$ is subtracted from a current of exactly the same magnitude delivered by $L_s$, which means that only a resonant discharge current of the stray capacitance $C_p$ of the solar array through $L_s$ is seen by $SS_1$ in the closed state and by the shunted section.

Operating stability is provided by the following elements:
current cycle of limited amplitude; and
no oscillation or drift in voltage or current is possible at an undesired frequency.

Operating frequency is determined by the hysteresis of the comparator COMP1, whence the limited current cycle and the moderate value of the ripple in the bus voltage V.

FIG. 8c is a graph in which the curve representing the current $I_{SCN}$ as a function of the voltage $V_s$ of the array of solar cells is shown at the opening of the shunt switch $SS_1$.

Portion I corresponds to charging $C_p$. When the bus voltage V is reached, $C_p$ continues to be charged, the voltage continues to rise, but the current decreases (portion II of the curve). The current I begins to be established through $L_o$, and the current supplied ends up by rising (portion III of the curve) to the point where the maximum power Pmax is delivered.

Figure 6:
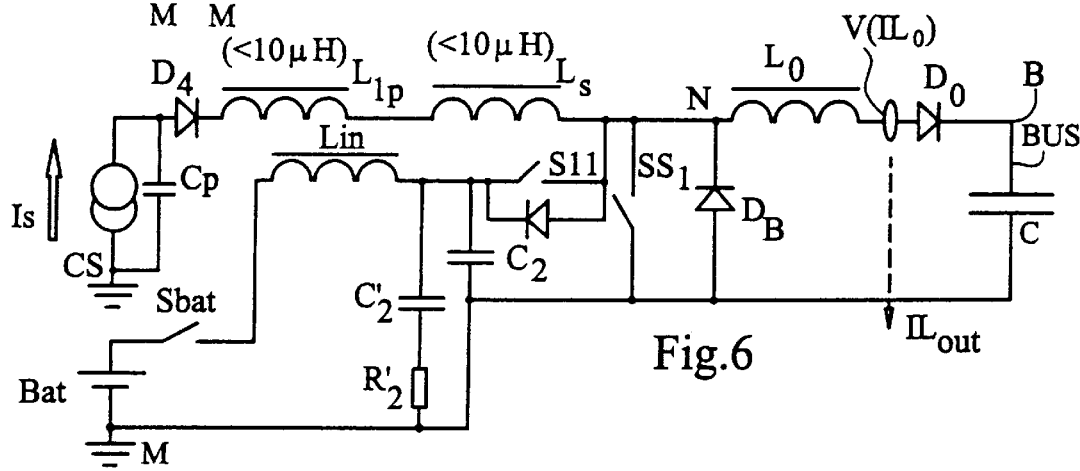
FIG. 6 shows an embodiment of a module of the invention that integrates the shunt and discharge functions.

In the event of a sudden transient taking current from the bus, it might nevertheless be feared that there would be an abnormal voltage drop on the bus. However this does not happen since the voltage of the solar array can rise sufficiently to force current through $L_o$. FIG. 6 shows a module associating a shunt function and a battery discharge function. Elements common with the module of FIG. 4 are given the same references. The additional elements are the battery Bat, the safety switch $S_{bat}$, the inductor Lin and the diode $D_B$. The node point N is very important since that is where summing takes place between the currents supplied by the solar cells and the currents supplied by the battery(ies).

In its most general form, the filter is then of the damped capacitive type so as to satisfy simultaneously conditions relating to discharge mode (filtering) and to shunt mode (protection against voltage surges).

It will be observed that in battery discharge mode ($S_{11}$ closed), the shunt switch $SS_1$ is kept open to allow the two above-mentioned currents to be added together, in particular in electrical propulsion mode where the current through $L_o$ can be greater than the current which the solar panels can supply.

When $S_{11}$ is closed, it is nevertheless possible to use the shunt switch $SS_1$ to increase the efficiency of the system in discharge mode, but in that case, use of the current supplied by the solar cells is not optimized.

Figure 7:
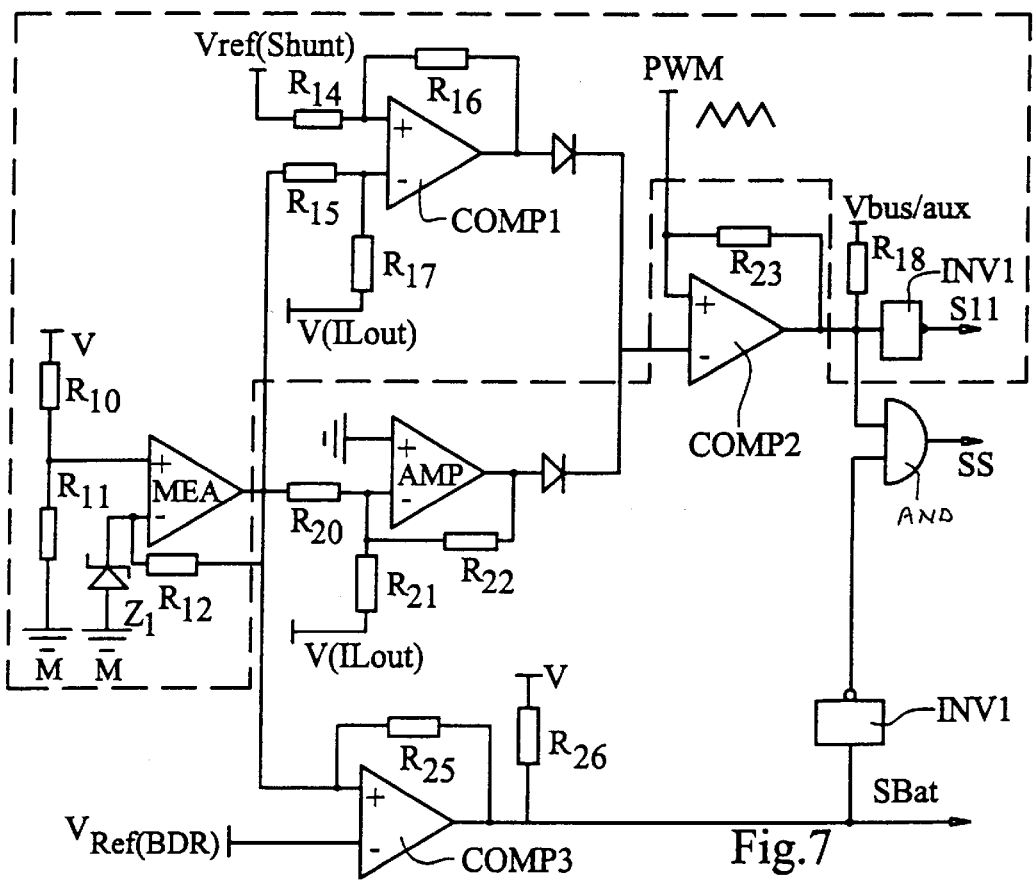
FIG. 7 shows a control circuit for controlling the FIG. 6 circuit.

FIG. 7 shows a control circuit suitable for the module of FIG. 6. The portion which is situated in the dashed-line box corresponds to operation in shunt mode as shown in FIG. 5.

The output from the amplifier MEA is also applied via a resistor $R_{20}$ to the inverting input of an operational amplifier AMP which has a negative feedback resistor $R_{22}$.

The outputs from the comparators COMP1 and AMP are applied to the inverting input of a comparator COMP2 having a resistor $R_{23}$ mounted to provide positive feedback and having its non-inverting input receiving a sawtooth voltage PWM. The output of COMP2 is applied to S, via a logic inverter INV1, but the switch $SS_1$ is controlled by an AND gate having one input receiving the output from the comparator COMP2. The other input of the AND gate receives the output from an inverter INV2 whose input is connected to the output of a comparator amplifier COMP2 having a resistor $R_2$. connected to provide positive feedback, having its non-inverting input connected to the output of the comparator MEA and having its inverting input connected to receive a reference voltage Vref(BDR) which determines the battery discharge operating range. The function of the comparator COMP3 is to determine whether the system is in the shunt mode operating range or in the discharge mode operating range.

If the output signal from MEA is such that the system is in discharge mode, the output from the comparator COMP3 causes the switch Sbat to close and the shunt switch $SS_1$ is deactivated via the inverter INV2 which produces a logic zero at its output, thereby turning off the AND gate.

The reference value of the current amplifier AMP is determined by the output from the amplifier MEA which gives a signal proportional to the voltage error on the bus relative to the reference set by the zener diode $Z_1$. The output from the current amplifier AMP is compared with the sawtooth signal PWM to control the switch $S_{11}$ via the output from comparator COMP2.

The output of COMP2 is also applied to the other input of the AND gate to control the shunt switch $SS_1$ when closure thereof is not deactivated by closure of the switch Sbat. It will be observed that the current controlling the shunt switch $SS_1$ also passes through the comparator COMP2, but its operation is not affected by the presence of the sawtooth signal since it operates at a lower frequency, thus providing a filter effect, and the signal controlling the shunt switch $SS_1$ is in a logic state 1 or a logic state 0 which is not modified by the existence of the sawtooth signal.

The switch Sbat can also operate to protect in conventional manner the module in the event of a voltage surge, by means of a logic circuit which is not described herein. Sbat can also be taken out of circuit in the event of a failure of the diode, the shunt switch $SS_1$, or indeed in the event of the current sensor drifting.

Figure 9:
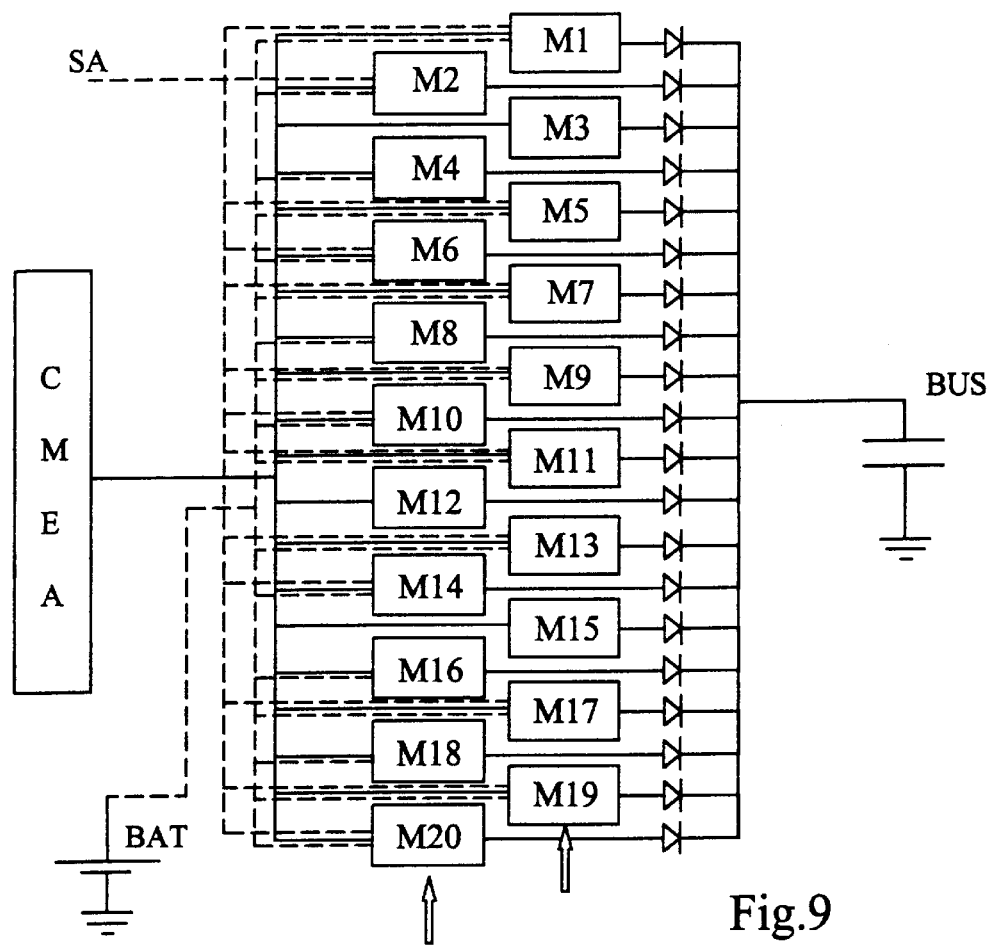
FIG. 9 shows a multi-module system comprising, in an embodiment of the invention, modules that combine the shunt and the discharge functions, or indeed, in a preferred embodiment, the shunt, the discharge, and the charging functions, with an example of such a module being shown in FIG. 11.

The module of the invention can be integrated to a great extent, as shown for example by the topology of FIG. 9 which makes use of 20 modules M1 to M20 each powered by the solar array in one or more sections, by the battery(ies) BAT in one or more sections, and by the control signals delivered by the control circuit CMEA. In the two function case (shunt and discharge), the modules may, for example, be as described in FIG. 6, and they can be controlled individually or in sections, as described with reference to FIG. 7.

Figure 10:
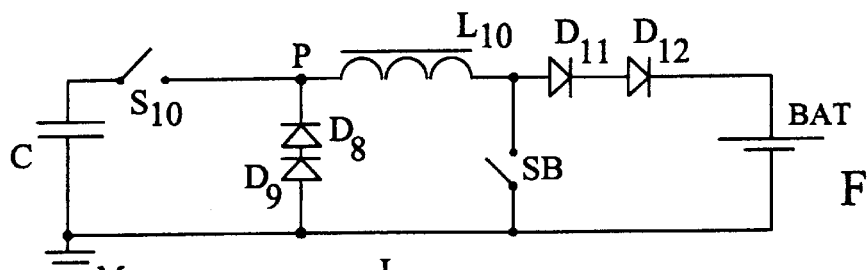
FIG. 10 shows a charging module of conventional type.

Alternatively, the modules can also be adapted to be capable of performing the battery charging function, e.g. by adding an additional charge regulating circuit to some of the modules and as shown in FIG. 10. In principle, a charge regulator is used conventionally for each battery. The circuit shown in FIG. 10 has a switch $S_{10}$, two reverse-connected diodes, a series inductor $L_{10}$ and two forward-connected diodes ($D_{11}$, $D_{12}$) in series between a terminal of a voltage boosting circuit SB and the active terminal of the battery Bat to be recharged.

This circuit is nevertheless not optimum, since recharging is powered by the bus and the power delivered on the bus is reduced by the efficiency coefficient of the shunt.

Figure 11:
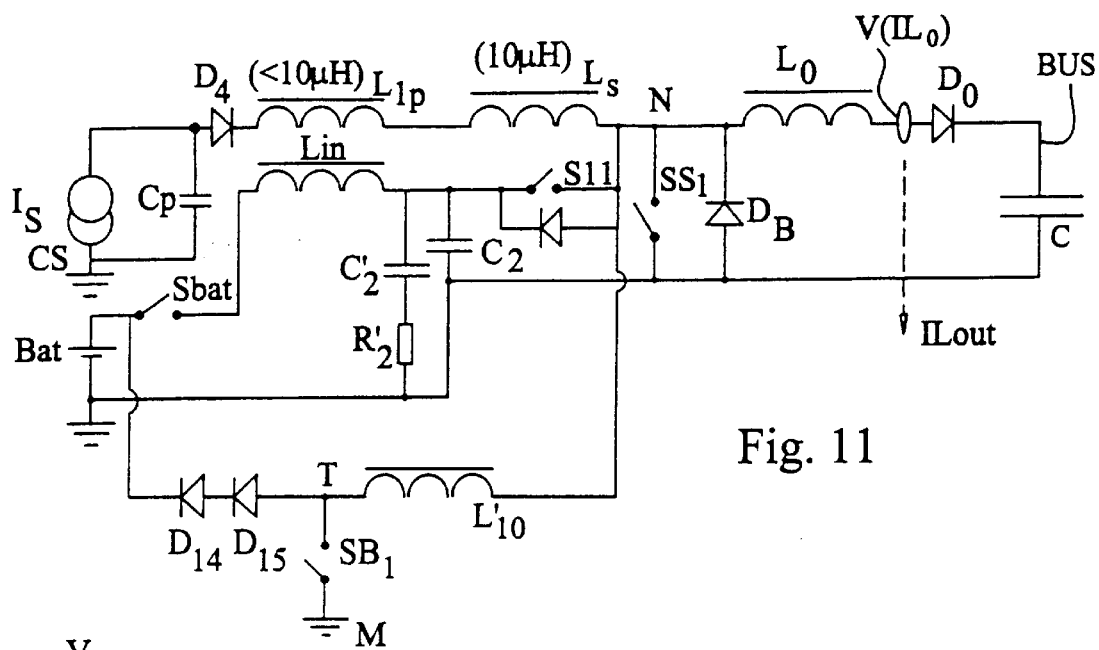
FIG. 11 shows an example of another embodiment of the module of the invention.

A preferred embodiment consists in integrating the charging regulator in the corresponding module, using the circuit shown in FIG. 11 in which elements in common with FIG. 6 retain the same references. In this topology, the current supplied by the solar cells is used directly to charge the batteries in charging mode.

The additional elements of FIG. 11 are the inductor $L'_{10}$ connected between the node point N and the point T, two forward-connected diodes $D_{14}$ and $D_{15}$ between the point T and the active terminal of the battery Bat, and the voltage boost switching circuit $SB_1$ for forming a voltage boost regulator.

In the charging position, Sbat is open, $SS_1$ is open, and $S_{11}$ is closed so that the current $I_s$ is fed both to $L'_{10}$ and to $L_o$.

It will be observed that in the event of $SB_1$ failing in the closed state, this amounts to the module remaining permanently shunted and the fault does not propagate to the other modules.

The advantages of the topology of the module of the invention are summarized below:

low shunt switching losses because of the presence, by compensation, of zero current during shunting;

small ripple in the voltage V on the bus in a stable operating state;

higher operating frequency than in the prior art; and it is possible to use a single Schottky diode in the output instead of using two as before (see FIG. 2).

What is claimed is:

1. A power supply system having sequentially controlled converter modules, at least some of the modules being buck modules, and having at least two operating modes and designed to operate in association with other modules to provide a regulated electrical power supply to an electrical bus from at least a first electricity source, the modules comprising:

a first self-inductive branch extending between a power supply terminal of the first source and a node point, and which is functionally associated with a shunt switch connected between the node point and a common mode pole; and a second branch extending between the node point and the common mode pole and presenting in series a controlled switch and a filter, and wherein the modules present a shunt regulation mode by controlling the shunt switch, and a discharge mode by keeping the controlled switch closed.

2. A power supply system according to claim 1, wherein the controlled switch has a first terminal connected to a first terminal of the filter, and a second terminal situated at said node point.

3. A power supply system according to claim 1, wherein the filter is a capacitive filter, and is preferably damped.

4. A power supply system having sequentially controlled converter modules, at least some of the modules having at least two operating modes and designed to operate in association with other modules to provide a regulated electrical power supply to an electrical bus from at least a first electricity source, the modules comprising:

a first self-inductive branch extending between a power supply terminal of the first source and a node point, and which is functionally associated with a shunt switch connected between the node point and a common mode pole; and a second branch extending between the node point and the common mode pole and presenting in series a controlled switch and a filter, and wherein the modules present a shunt regulation mode by controlling the shunt switch, and a discharge mode by keeping the controlled switch closed;

wherein the filter is a capacitive filter, and is preferably damped; and wherein the filter has a first and/or second filter section, the first filter branch being constituted by a first capacitor and the second section being constituted by a second capacitor in series with a damper element, in particular a resistive damper element.

5. A power supply system according to claim 1, wherein said node point is connected to an output terminal of the module through at least one first self-inductive element.

6. A power supply system according to claim 1, wherein the filter presents a first terminal for powering by an active terminal of at least one second source of electrical energy, at least one battery.

7. A power supply system according to claim 6, wherein said first terminal for feeding the filter is connected to an output terminal of an input self-inductive element whose input terminal is connected to an active terminal of the second source if any, via a switch element.

8. A power supply system according to claim 6, including a first diode connected in parallel between the node point and the common mode pole.

9. A power supply system having sequentially controlled power converter modules, at least some of the modules having at least two operating modes and designed to operate in association with other modules to provide a regulated electrical power supply to an electrical bus from at least a first electricity source, the modules comprising:

a first self-inductive branch extending between a power supply terminal of the first source and a node point, and which is functionally associated with a shunt switch connected between the node point and a common mode pole;

a second branch extending between the node point and the common mode pole and presenting in series a controlled switch and a filter, and wherein the modules present a shunt regulation mode by controlling the shunt switch, and a discharge mode by keeping the controlled switch closed;

wherein the filter presents a first terminal for powering by an active terminal of at least one second source of electrical energy, at least one battery; and including, in series between the node point and said active terminal of the second source, at least one second self-inductive element, and at least one diode that is forward-connected relative to current for charging one of said batteries constituting said second source, and further including a controllable charging switch connected between a terminal common to said second self-inductive element and said diode, and the common mode pole.

10. A power supply system according to claim 1, including a control circuit.

11. A power supply system according to claim 10, wherein the control circuit has at least one operating mode in which the controlled switch cannot be in the closed position unless the shunt switch is in the open position.

12. A power supply system according to claim 10, wherein the control circuit has at least one operating mode in which the controlled switch and the shunt switch are controlled in phase opposition.

13. A power supply system according to claim 9, wherein the control circuit has a comparator for controlling the shunt switch as a function of the result of comparing the voltage at the output from the module and the current flowing through said first self-inductive element with respective thresholds.

14. A power supply system according to claim 9, wherein the control circuit has a logic element deactivating closure of the shunt switch with the control circuit is in a "discharge" state for discharging the second source.

15. A power supply system according to claim 9, wherein the control circuit has an activation circuit operating by applying on/off control to the controlled switch in response to comparing a sawtooth signal with the output voltage from the module.

* * * * *